W. D. STONER.
ANTISKID CHAIN FOR TIRES.
APPLICATION FILED JAN. 29, 1918.
1,278,782.
Patented Sept. 10, 1918.
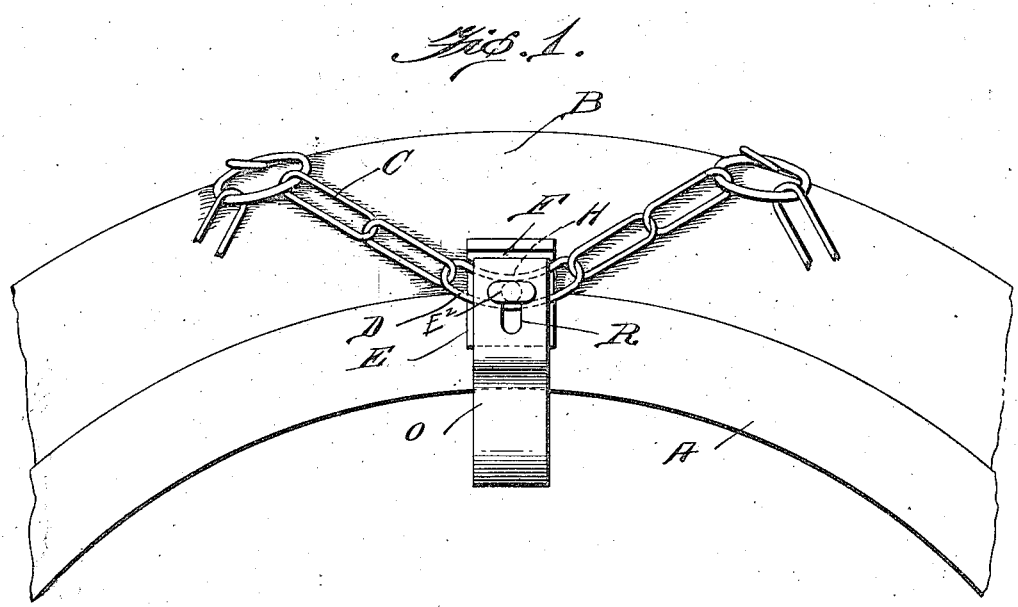
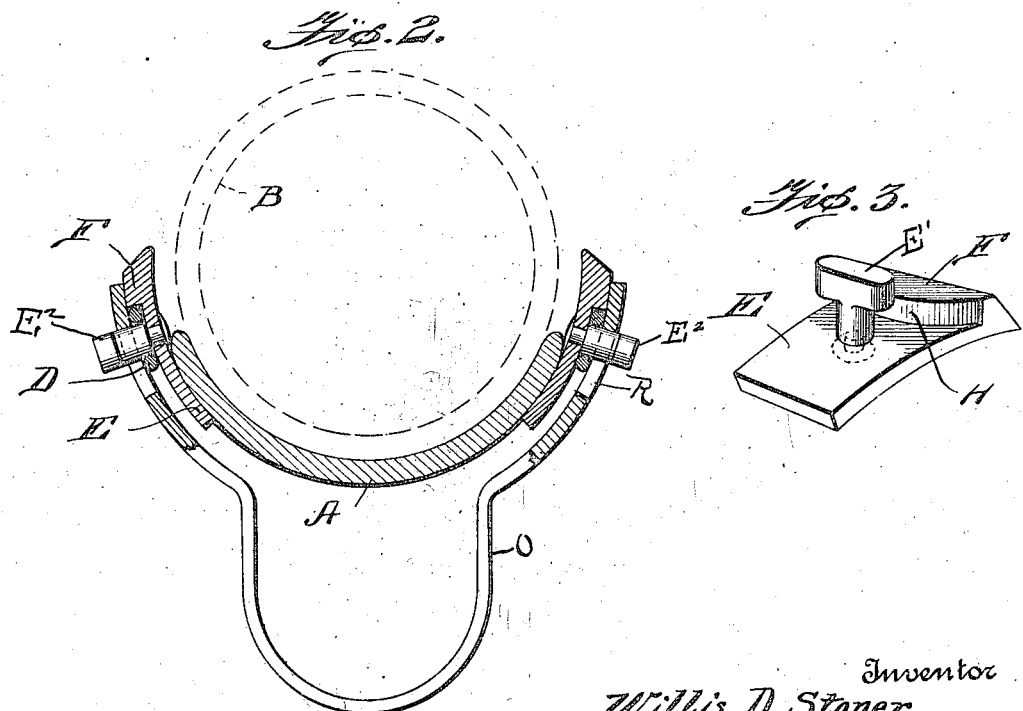
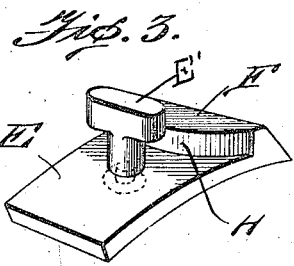
Inventor
Willis D. Stoner
Witnesses
Attorney

UNITED STATES PATENT OFFICE.

WILLIS D. STONER, OF SPRINGFIELD, OHIO, ASSIGNOR OF ONE-HALF TO HARVEY H. STONER, OF SPRINGFIELD, OHIO.

ANTISKID-CHAIN FOR TIRES.

1,278,782.  Specification of Letters Patent.  Patented Sept. 10, 1918.

Application filed January 29, 1918  Serial No. 214,361.

*To all whom it may concern:*

Be it known that I, WILLIS D. STONER, a citizen of the United States, residing at Springfield, in the county of Clark and State of Ohio, have invented certain new and useful Improvements in Antiskid-Chains for Tires, and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for attaching anti-skid chains to pneumatic tires, and consists of a simple and efficient device of this nature having various details of construction, combinations and arrangements of parts which will be hereinafter fully described, shown in the accompanying drawings and then specifically defined in the appended claim.

The invention is illustrated in the accompanying drawings which, with the letters of reference marked thereon, form a part of this specification and in which:

Figure 1 is a side elevation showing the application of my invention to the tire of a wheel.

Fig. 2 is a cross sectional view through the felly and fastening means, and

Fig. 3 is a detail perspective view showing parts disassembled.

Reference now being had to the details of the drawings by letter:

A designates the felly of a wheel and B the pneumatic tire about which an anti-skid chain C of any desired construction is to be held. In the present instance the same is made of links one of which, D, is curved at its longitudinal center at which point it is adapted to be connected to the fastening means. Plates E are provided at intervals, each of which has a shouldered portion F convexed as at H upon the edge to conform to the curvature of the link D which bears frictionally against the same. Said plate, a detail of which is shown in Fig. 3 of the drawings, has a headed key E' swiveled thereto and which after being inserted through the slot R in the yoke O it is adapted to be turned at right angles to the slot, as shown in the drawings, in order to hold the yoke in place.

In applying the anti-skid chain it is placed about the tread surface of the tire in the manner shown in Fig. 1 of the drawings and the curved links D are placed against the convexed shoulders H of the plates E.

The buttons E' are inserted through the link D and the slot R and then turned at right angles to the length of the slot, as shown in Fig. 1 of the drawings.

By the provision of the means shown and described it will be noted that a simple and efficient device is afforded whereby an anti-skid chain may be easily and quickly applied to a tire and removed therefrom without in any way disfiguring the rim or tire.

What I claim to be new is:

A device for fastening anti-skid chains upon pneumatic tires consisting of plates, keys mounted thereon, a slotted yoke for engagement about the felly of a wheel, keys swivelly connected to said plates and engaging the slotted portions of the yoke, said plates having a shouldered portion engaged by one of the links of the anti-skid chain.

In testimony whereof I hereunto affix my signature in presence of two witnesses.

WILLIS D. STONER.

Witnesses:
A. L. HOUGH,
FRANKLIN H. HOUGH